United States Patent [19]

Wilhelm

[11] Patent Number: 4,462,969
[45] Date of Patent: Jul. 31, 1984

[54] REGENERATION OF SULFUR DIOXIDE SCRUBBER LIQUOR

[75] Inventor: James H. Wilhelm, Sandy, Utah

[73] Assignee: Central Illinois Public Service Company, Springfield, Ill.

[21] Appl. No.: 503,040

[22] Filed: Jun. 10, 1983

[51] Int. Cl.³ .................. C01B 17/00; C01B 17/45; C01B 17/62

[52] U.S. Cl. .................. 423/242; 423/512 A; 423/519

[58] Field of Search .......... 423/242 A, 242 R, 244 A, 423/244 R, 512 A, 519

[56] References Cited

U.S. PATENT DOCUMENTS

| | | | |
|---|---|---|---|
| 3,989,797 | 11/1976 | Brady et al. | 423/242 |
| 4,331,640 | 5/1982 | Morita et al. | 423/512 A |
| 4,379,130 | 4/1983 | Brady | 423/519 |
| 4,388,282 | 6/1983 | Chou et al. | 423/242 |
| 4,410,500 | 10/1983 | Wang et al. | 423/512 A |
| 4,411,875 | 10/1983 | Butler et al. | 423/512 A |

Primary Examiner—Gregory A. Heller
Attorney, Agent, or Firm—Robert R. Finch

[57] ABSTRACT

A process of regeneration of scrubber bleed liquor discharged from $SO_2$ gas scrubber in which there are provided two serially connected sludge blankets containing 15–40% finely divided solids in liquor overlain by a relatively clear supernatant liquor. The bleed liquor is introduced into the first blanket along with an aqueous slurry of ground limestone, liquor and limestone partially react in the first blanket then they are transferred to the second blanket for further reaction, after which the liquor is recycled to the scrubber and a proportional amount of reacted limestone is wasted. The liquor has a relatively short residence time in the system on the order of 30–180 minutes while solids residence in the system is on the order of 6 to 24 hours. A special embodiment is provided for use when the first sludge blanket is in a relatively small tank in which only a portion of the bleed liquor is supplied to the first sludge blanket and the balance is injected directly into the second sludge blanket.

5 Claims, 3 Drawing Figures

REGENERATION OF SULFUR DIOXIDE SCRUBBER LIQUOR

FIELD OF THE INVENTION

The invention relates generally to removal of sulfur dioxide gas from flue gasses by scrubbing with a sodium based alkaline liquid that absorbs and removes sulfur dioxide, then regenerating the resulting solution in accordance with the well known recausticizing reactions in which the spent scrubber bleed liquor is treated with a calcium compound, typically lime or slaked lime. More particularly, this invention relates to improvements in the recausticizing system to enable use of relatively inexpensive limestone as the calcium source.

STATEMENT OF THE ART

A typical prior process is disclosed in U.S. Pat. No. 3,873,532 which describes a system in which the scrubbing liquor is regenerated by reaction with an aqueous slurry of calcium compound derived from lime or slaked lime and the resulting mixture is subjected to sedimentation to effect separation of calcium compound precipitates from the regenerated scrubber liquor. The liquor is treated with makeup $Na_2CO_3$ and then is recycled to the scrubber. A portion of the calcium compound precipitates is recycled to the recausticizing reaction to serve as seed for crystal growth. The balance of solid reaction products is filtered and discharged from the system.

Several variations of the above system are in use, but the successful systems all use lime or slaked lime for recausticizing. There have been prior attempts to use relatively inexpensive limestone as the calcium source for recausticizing, but prior to the present invention, they have been unsuccessful primarily because the relatively low reactivity of limestone requires that a large excess be supplied with a consequent increase in material cost and operating expense. Moreover, such prior attempts almost invariably generated a surplus of fine solids which result in undesirable suspended solids in the recycled scrubbing liquor and/or extra expense for removing solids before use of the liquor.

SUMMARY OF THE INVENTION

For purposes of discussing this invention the essential reactions in the total system are:
In the Scrubber:
(1) $Na_2SO_3 + SO_2 + H_2 \rightarrow 2NaHSO_3$ (due to oxidation some $Na_2SO_4$ is also produced)
and
In the recausticizing stage:
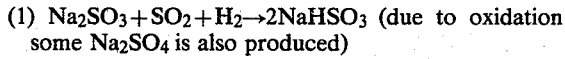
(2) $NaHSO_3 + CaCO_3 \rightarrow CaSO_3 + Na_2SO_3 + CO_2 + H_2O$
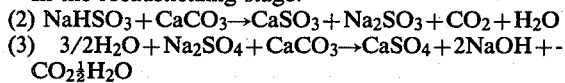
(3) $3/2H_2O + Na_2SO_4 + CaCO_3 \rightarrow CaSO_4 + 2NaOH + CO_2\frac{1}{2}H_2O$ Make up sodium in the form of soda ash is usually added to the liquor after the recausticizing reactions (2) and (3) are completed and resulting liquor clarified.

The present invention is designed for use in systems wherein the scrubber bleed liquor to be recausticized has a pH in the range of 5.5 to 6.0.

The invention provides, in an $SO_2$-gas scrubbing system of the type described, a specific process for recausticizing scrubber bleed liquor that enables use of relatively inexpensive limestone as the calcium source on an economic basis.

In its simplest form, the invention comprises the steps of establishing two serially connected reaction stages and establishing in each stage a sludge layer or blanket containing about from 15%-40% but preferably about 25% solids solids including ground limestone along with the solid and liquid products of the reactions between limestone and scrubber bleed liquor according to equations (2) and (3) above. In accordance with the invention, limestone solids and scrubber bleed liquor are introduced into the sludge layer in the first stage at distinctly different elevations. The liquor is introduced in the lower portion of the sludge blanket and the limestone solids at a higher elevation into the upper portion or even onto the top of the sludge blanket. Since liquor continuously overflows from the reactor tank, the incoming liquor will rise up through the sludge blanket to the supernatant zone essentially counter currently to the solids which migrate downwardly into the sludge blanket.

From the first stage, supernatant liquor and sludge are separately withdrawn and introduced into a sludge blanket in the second stage wherein reaction continues to completion concomitantly with separation of the liquid and solid fractions by sedimentation. The liquor, which may be subjected to further clarification, is, after addition of make-up soda ash, recycled to the scrubbers and the solids are wasted, although for process balance and seeding a portion may be recycled.

Important requirements of the invention are the maintenance of two sludge blankets and introduction of the limestone and liquor into distinctly different relative elevations in the sludge blankets. It is necessary that the bleed liquor be introduced into submergence in a lower part of the sludge blanket at an elevation significantly below that at which limestone initially enters the blanket. Thus, a limestone slurry, typically at a pH of 7–8, may be supplied onto the top of the sludge blanket while the scrubber bleed liquor, at a usual pH of 5.5 is injected at or near the bottom of the blanket where pH is in a range from 5.9–6.1. A vertical pH gradient is thus established in the blanket. The residence time of liquor and solids is adjusted to achieve the desired result as to degree of completion of reaction and particle size growth.

In the blanket, conditions favor reaction in accordance with equations (2) and (3) above both of which result in release of $CO_2$ gas that stirs the reaction mass and tends to suspend fine solids, both reacted and unreacted. As the reaction proceeds, the solid reaction products grow, both by agglomeration and by precipitation onto smaller crystals. Growing solid particles mix with and settle into the sludge blanket where they are retained for continued reaction and growth until withdrawn.

The sludge blanket provides several advantages. First, it brings the solids close together in a matrix of liquor, thus encouraging reaction and solids growth as the reaction proceeds. In addition it screens and thus restrains fine solids from escaping the sludge blanket and eventually the reactor.

Use of the sludge blanket wherein a solids concentration of 15–40% and preferably 20 to 30% is maintained also provides the advantage that for a given tank the liquor residence time can be relatively short yet the solids residence time is long, usually a multiple of the liquor residence. For instance, in the first stage, liquor residence is 50–60 minutes and in the second stage may be up to 170 minutes. At the same time, in both stages the total solids residence is 6–24 hours. Of this the solids residence in the first stage is 30 to 180 minutes and in the second stage is 2 to 24 hours. The relatively long solids residence maximizes time for reaction and crystal growth while the relatively low sludge volume minimizes tank requirement as does the short liquor residence time. Yet a high throughput rate is maintained.

The sludge blanket presents an environment of specific conditions. For instance, the solids concentration in the sludge blanket is 15–40% solids by weight. At such concentrations the blanket looks almost solid. The blanket is overlain by a relatively clear supernatant liquor. These conditions are to be contrasted with the usual well-mixed stirred mass containing only 1% to 3% solids. The supernatant liquor contains less than 2% solids.

It is important that reaction conditions in the reaction stages be controlled to achieve the desired end result which may be summarized as:

(1) Less than 10% unreacted $CaCO_3$
(2) Waste solids filter cake of at least 60% by weight solids
(3) Less than 500 ppm suspended solids in the second stage effluent
(4) pH of about 6.2 in second stage effluent.

The ground limestone is added to the first stage in slurry form in a quantity to supply the stoichrometric amount for reaction with the $SO_2$ carried from the scrubber in the bleed liquor. The limestone is conveniently crushed to minus 325 mesh and added as slurry to liquor in the tank. Then, by suitable gentle mixing a sludge blanket overlain by a relatively clear supernatant liquid is established and maintained. Incoming bleed liquor is introduced into the bottom of the sludge blanket and the limestone slurry is added on or near the top of the blanket.

Maintaining the second stage effluent at a pH of about 6.2 is important. If the pH of the second stage effluent drops significantly below 6.2, say to 6.0, the volume needed in the scrubber may increase by as much as 50% with a consequent increase in volumes to be handled throughout the system. A second stage effluent with a pH much above 6.2 usually reduces the reaction rate so much that it is difficult to achieve an acceptable degree of limestone reaction.

The pH of second stage effluent (the recausticized liquor) is critical and is controlled to be at or near 6.2. This is accomplished by regulating conditions in the first stage. That is, in the first stage the residence time of solids and liquor as well as the ratio of limestone to bleed liquor and agitation are regulated as necessary to control and adjust the pH of the second stage effluent to maintain it at the desired level near 6.2. The most important regulation is the ratio of limestone to bleed liquor in the first stage. The residence and ratio of limestone and bleed liquor in the first stage and the degrees of agitation are then adjusted so that the second stage effluent has a pH at or near 6.2. This usually results in maintaining the first stage effluent in a pH range of 6.3 to 6.5.

For operation, the supply of bleed liquor to the first stage is fixed and regulation is achieved by adjusting the limestone supply rate. If the pH of the second stage effluent gets too high the limestone addition to the first stage is decreased. If the pH drops much below 6.2, say to 6.0, the rate of limestone addition in the first stage is increased. In both cases the rate of bleed liquor supply remains constant. Results of adjustments to the limestone bleed liquor ratio in the first stage do not show up in the second stage effluent for at least 30 minutes and sometimes it takes as long as 60 minutes.

If a quicker change in pH of second stage effluent is needed, it may be obtained by changing the rate of transfer of sludge blanket contents from the first to second stage for a short period of say 30 minutes. In this connection, care must be taken not to change the transfer rate too much or alter significantly the respective solids concentrations of the first and second sludge blankets as this will destroy the effectiveness of at least one sludge blanket and impair the entire system.

Residence time of liquor, particularly in the first stage is important. In general, I have found that, with a grind of limestone of essentially minus 325 mesh, a liquor residence time of 50–60 minutes in the first stage yields optimum results. Less than 50 minutes is too short for adequate reaction and a liquor residence longer than 60 minutes is unnecessary and merely increases costs for tankage and space without any benefits. Keeping liquor resident in the first stage 50 to 60 minutes and adjusting the other variables to achieve the 6.2 pH in the liquor overflow from the second stage results in reaction of at least 50–70% of the limestone in the first stage. This is the desired first stage goal and sets conditions for the second reaction stage.

The second stage reactor is sized to permit an increased liquor residence time on the order of three times that of the first reactor. Using average liquor residence times of 160 minutes in the second stage, and regulating conditions in both the first and second reactors to maintain a pH near 6.2 in the second stage effluent, the resulting quantity of unreacted limestone ($CaCO_3$) in the final filter cake will be low—in the 3–8% range; and the suspended solids content of the final thickener overflow will also be kept low—below 400 ppm.

For unique situations such as accomodating systems in which the first reaction tank is smaller than the second tank, (as opposed to the case where the second reactor is equal to or larger than the first) a special embodiment of the invention is provided in which the conditions in the two reaction stages are selected so gas evolution and resulting violent reaction that might otherwise occur in the second stage are minimized. This embodiment requires that all the limestone be added to the sludge blanket in the relatively smaller first reactor where it is mixed with only a portion of the total scrubber bleed liquor volume. The quantity of scrubber bleed liquor added to the first stage should be less than one-half the stoichiometrical requirement for reaction with the entire calcium content of all the limestone. In the first reaction stage, conditions are established so the initial contact of scrubber bleed liquor and limestone occurs in a sludge blanket under conditions of gentle agitation or kneading. The liquor is added to the lower part of the blanket and the solids to the top. Apparently, the fine solids are retained in the blanket and provide nuclei for further growth. If the solids are not sufficiently reacted in the sludge blanket there is an unusually high carryover of fines into the second reactor and beyond. This is due to the action of $CO_2$ gas and of course the fact that the fines are not screened or otherwise restrained by the sludge blanket.

In this embodiment of the invention, since the first tank is relatively small compared to the second tank, it is important that only part of the scrubber bleed liquor be added to the first stage. If too much is added, the reactions are violent and so much $CO_2$ gas generated that excess fines, a large part of which are unreacted, are carried over to the second stage and eventually into the final regenerated scrubber liquor from which they must be removed by some means lest they foul the system by scaling. Moreover, even though the fine $CaCO_3$ is subjected to further reaction in the second stage, there is still an undesirably high percentage of unreacted $CaCO_3$ in the final solids discharged to waste. Because of the smaller first tank, more of the limestone is carried over to be reacted in the second stage resulting in higher $CO_2$ bubbling rates and carry over of more unreacted limestone to the second stage effluent. However, in the embodiment under discussion, both of the foregoing problems are avoided by the expedient of dividing the scrubber bleed liquor into two portions, mixing the first portion with the entire limestone supply in a sludge blanket in the first stage and introducing the balance of the bleed liquor into the sludge blanket of the second stage.

Use of sludge blankets as the reaction environment is necessary in this embodiment for the same reasons they are required in the basic invention.

In all embodiments of the invention, conditions of mixing in the sludge blanket are important. It is necessary that a gentle mixing be accomplished, but this must not be at the expense of fracturing already formed precipitates and other agglomerates. In general, in the first reactor a sludge blanket of about 20-30% solids is maintained. A separate mixer may be submerged in the blanket in the immediate vicinity of the points of introduction of limestone and scrubber bleed liquor. The mixer is operated at a tip speed of 3-10 f.p.s. or less. Obviously, the mixer speed may be varied to achieve the desired result and the type of mixer will influence the tip speed as will the density of sludge blanket and the size consist of the limestone. Rake arms are good general mixers and operate at extremely low tip speeds.

As in any continuous process involving several variables, adjustments will be required to accommodate local conditions and available reactants. For instance, it may be desirable or convenient to use a coarser limestone, or it may be necessary to install the system in existing tanks. The present invention is easily adaptable to accommodate most conditions. This flexibility is due to the particular combination of multiple reaction stages employing sludge blankets wherein the first stage essentially conditions the mass for further reaction in the second stage to achieve a high degree of reaction of the limestone, while yielding a recausticized liquor of low suspended solids and a readily dewaterable thickened sludge for waste.

In order that the invention may be more readily understood and carried into effect reference is made to the accompanying drawings and description thereof which are offered by way of example only and not in limitation of the invention the scope of which is defined by the appended claims and equivalents embraced therein rather than any preceding description.

IN THE DRAWINGS

Figure 1:
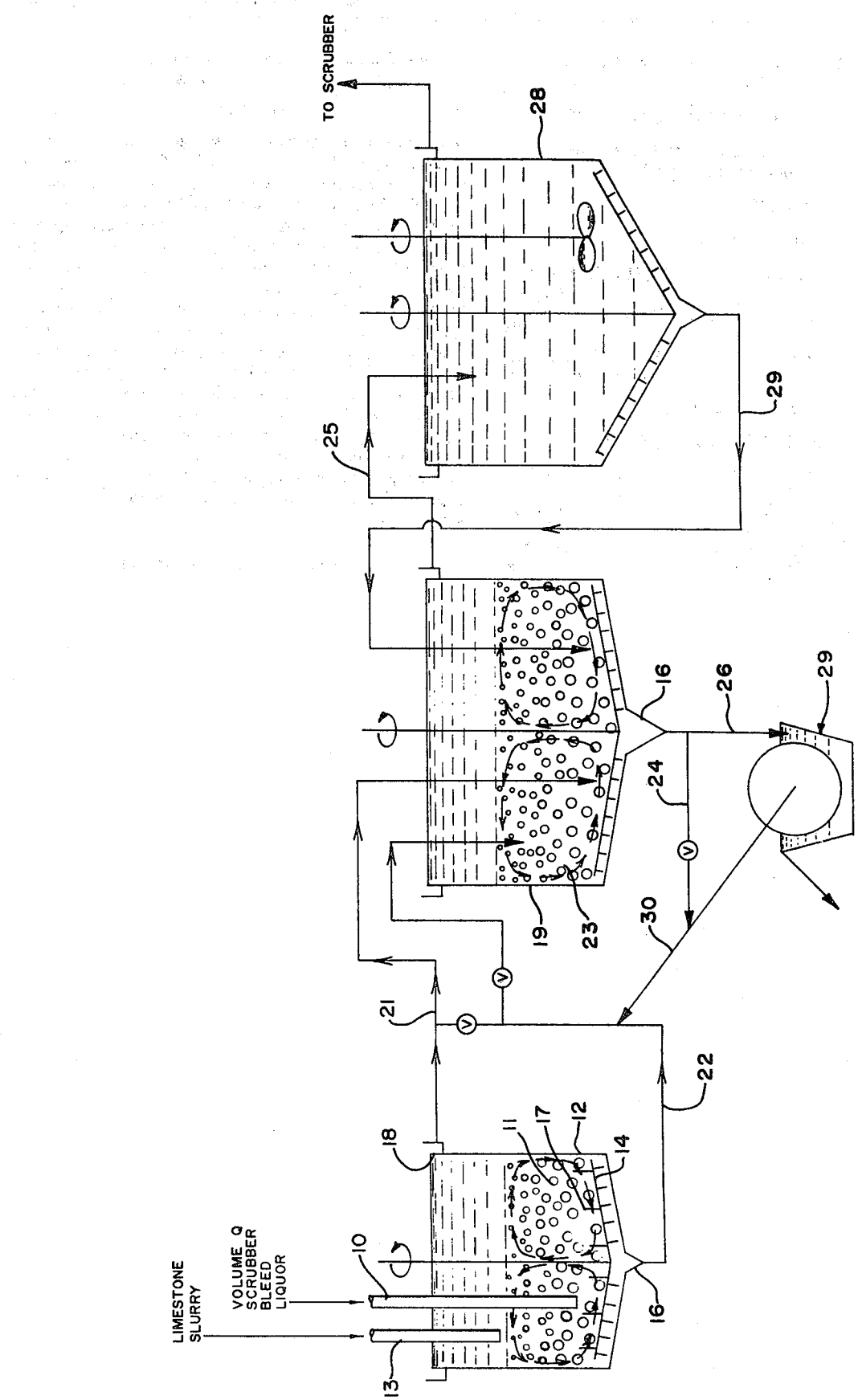
FIG. 1 is a flow diagram of the preferred embodiment of the invention.

In the flow sheet illustrated in FIG. 1, a volume Q of scrubber bleed liquor containing $SO_2$ as $Na_2SO_3$ and $Na_2SO_4$ is brought in through a conduit 10 to discharge in submergence in the lower portion of an ever changing sludge blanket 11 maintained in a first reactor 12. In the blanket, the liquor mixes with ground limestone also introduced via a suitable conduit 13 as a slurry near or onto the top of the sludge blanket 11.

The total quantity of limestone supplied is approximately equal the stoichiometric amount of $SO_2$ absorbed by bleed liquor in the scrubber. Reaction in the sludge blanket is enhanced by the gentle mixing effected by the usual thickener rake assembly 14 that kneads the sludge and moves it toward the center outlet 16 of the reactor. If desired, additional stirrers 17 can be provided. Such additional stirring devices will move slowly to mix the reactants to promote solids growth. A separate mixer (not shown) may be used, but care must be taken to avoid stirring so fast that crystal or flocs are broken. When using a separate mixer a maximum tip speed of 3 to 10 f.p.s. has proven optimum. Above this, excess fines, including unreacted $CaCO_3$, appear in the second stage effluent thus requiring polishing of the liquor before it is sent back to the scrubbers. Below this speed, the total reaction is incomplete and excess unreacted $CaCO_3$ appears. A proper stirring in the reactor results in a gentle motion following a path that is radially inward near the bottom of the bank, thence upwardly near the center of the tank and radially outwardly. Sludge can be withdrawn from the blanket at the bottom or any other desired elevation.

From the first reactor a volume of liquor about equal to the original incoming bleed liquor discharges to a second reactor 19 via a conduit 21. At the same time a volume of sludge from the blanket 11 is transferred via a suitable conduit 22 from the first reactor 12 to the second reactor 19 where it is introduced into submergence in a lower part of a sludge blanket 23 therein. If necessary to increase reaction or enhance control, the sludge and effluent liquor may be transferred separately to the second reactor. In such a case the liquor would be introduced into the lower portion of the sludge blanket in the second reactor and the sludge at or near the top of the blanket.

In the second stage, reaction continues further toward completion concomitantly with separation of the solids by sedimentation and clarification of the liquor preparatory to make up with soda ash and return to the scrubbers.

Sludge from the second stage reactor may be recycled to the second stage blanket through a conduit 24 as needed to keep the system in balance, maximize consumption of limestone and clarity of regenerated liquor. A quantity of sludge proportional to new solids supplied by the incoming fresh limestone is bled from the system via line 26 to a usual filter 29 whence solids are wasted and filtrate recycled or other disposition made thereof.

Make-up soda ash is added in a final clarifier-mixer 28 in which additional clarification may be carried out as desired for final polishing.

Numerous tests were run simulating the system illustrated in FIG. 1. In tests of the system illustrated in FIG. 1, the first reactor was a cylindrical vessel 12" in diameter, the second reactor was 18" in diameter and the final clarifier was 12.5 inches in diameter. Mississippi limestone ground to minus 325 mesh was made up as an aqueous 30 wt% slurry. A simulated bleed liquor was prepared by mixing sodium sulfite, sodium bisulfite, sodium sulfate, sodium chloride and magnesium sulfate to yield a liquor with a pH of 5.5.

In typical tests: In the first stage the liquor residence time was 56 minutes, and the effluent pH was 5.9 while in the second stage the liquor residence was 150 minutes and the effluent pH was 6.1. The unreacted $CaCO_3$ was 12.9% and the final clarifier suspended solids was about 420 ppm. The waste solids filtered to yield a discharge cake of 63.7% solids dry weight. These were relatively short tests of only 7 hours duration. In the usual case the sludge residence is up to 24 hours and this has been shown to reduce unreacted $CaCO_3$ to well below 10% and the suspended solids to well below 400 ppm.

Make-up soda ash may be added to the system in a conventional mixer in which additional clarification may be carried out if desired for final polishing before return to the scrubber. Solids collected in tank 28 are recycled, via a conduit 29, to the second reactor 19.

The maintenance and use of the sludge blanket is important because it enhances reaction by promoting liquid-solids contact. The blanket provides a long solids residence time necessary for complete reaction of limestone and at the same time completes regeneration of the bleed liquor with a relatively very short residence time. The net result is to allow the process to be carried out in a much more compact system than would be the case if the dilute (1-2% solid) reaction masses of the stirred system was used.

Moreover, the sludge blanket provides an environment that is very forgiving and accepts a wide range of limestone size consist. The only requirements to accept a coarser grind, say 35 mesh, is to establish a fairly dense sludge blanket (25%) and increase the solids residence time to enable completion of reaction.

Figure 2:
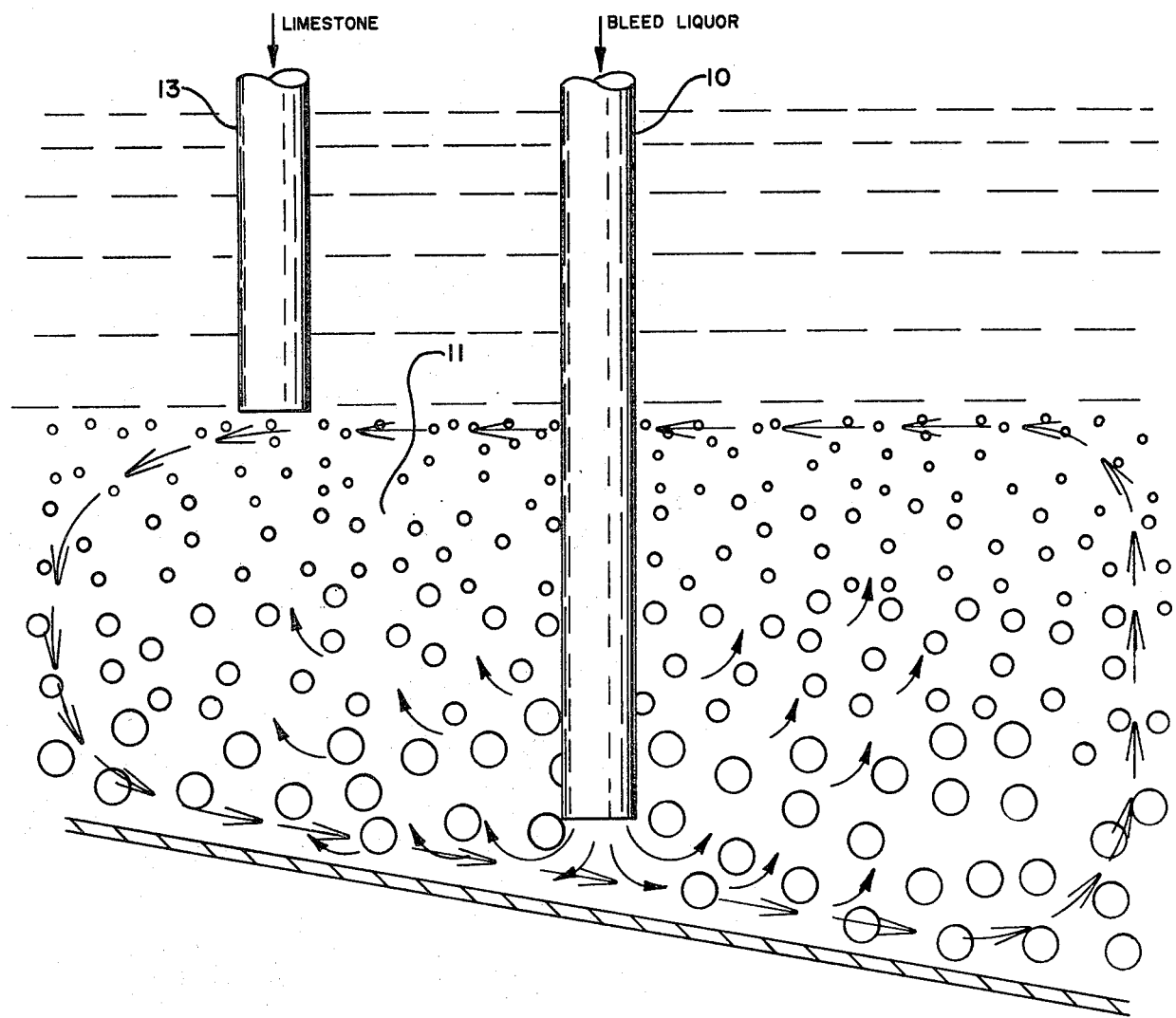
FIG. 2 is a partial view illustrating the mixing and reaction environment in a sludge bed.

As shown in FIG. 2, the liquor enters the lower part of the sludge blanket 11 while the limestone is supplied onto or near the top of the blanket. As indicated by the arrows adjacent the edge of the blanket, the solids, under the influence of the gentle action of the rake assembly (see 14 in FIG. 1) travel a repetitive circular pattern while the liquor moves generally upwardly to displace effluent discharged over the weirs 18 (FIGS. 1 and 2).

Solids concentration in the sludge blankets is in the broad range of 15%-40% by weight, but preferably in the range of 20%-30%. This forces solids into close proximity thus encouraging solids growth by agglomeration and by precipitation onto existing solids. The blankets also insure long solids residence time thus insuring substantially complete reaction—above 95%. The liquor separately overflows the exit launder after a relatively short residence time. Typically, liquor residence is in the range of 30 to 180 minutes while the solids residence time is 6 to 24 hours. Both times will vary depending on conditions of reaction such as pH and limestone size consist.

Figure 3:
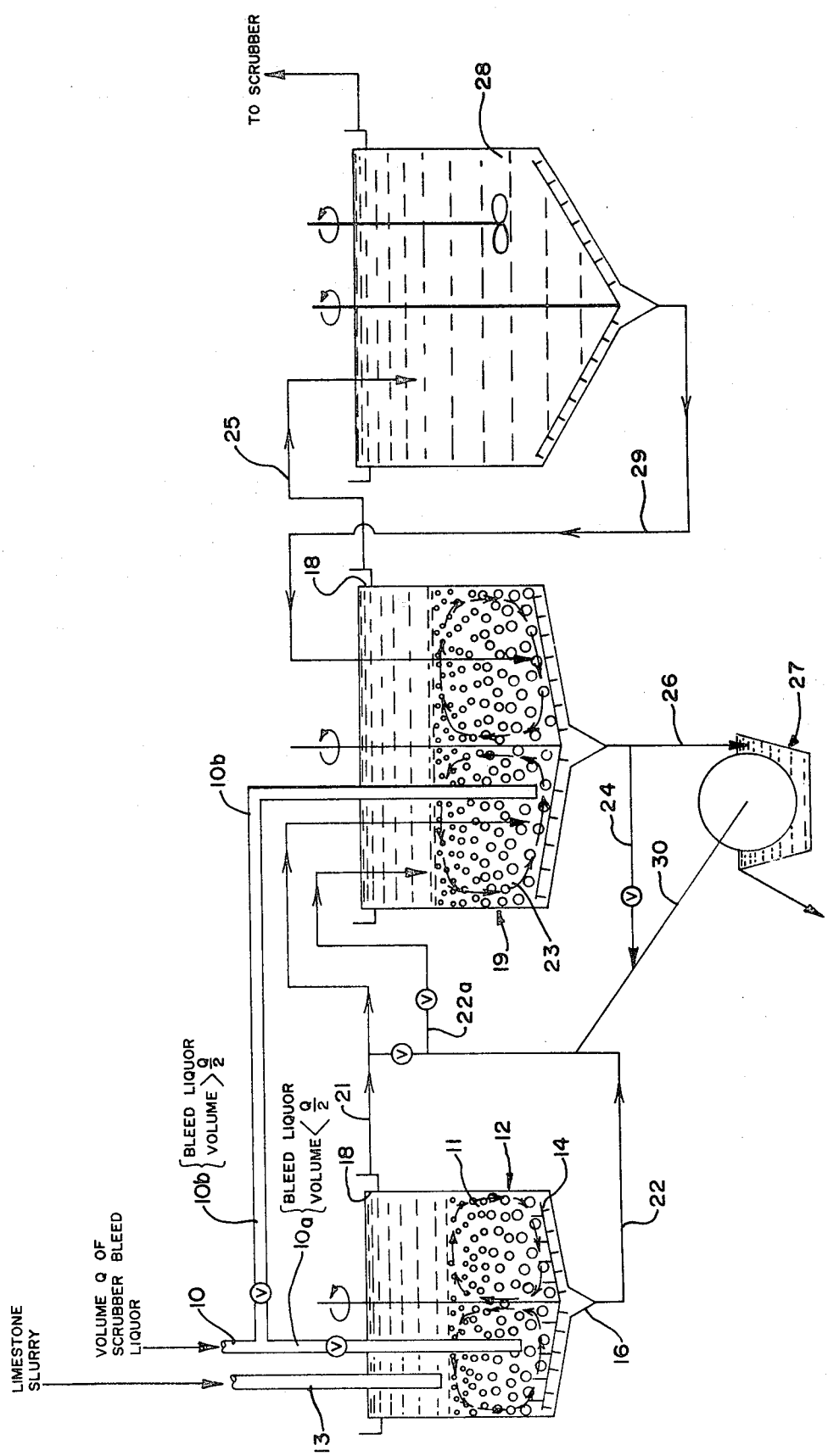
FIG. 3 is a flow diagram of a special embodiment of the invention.

FIG. 3 illustrates a special embodiment of the invention in which the bleed liquor is split into two streams that are supplied separately to the two reactors, but all of the limestone is added to the first stage. This embodiment is especially useful in situations where, for one reason or another, a relatively smaller first stage reaction tank is to be used. In such a case, if all the liquor is added to the relatively smaller tank, there will be a decreased liquor residence time for a given throughput. This will in turn result in incomplete reaction. Also, in addition to reducing reaction time, the higher throughput rate results in dilution and expansion of the sludge blanket thus severaly cutting down its ability to promote reaction, screen solids, and promote solids growth.

FIG. 3 is described hereinafter using the same reference numerals as in FIG. 1.

As illustrated in FIG. 3 a system incorporating the separate embodiment of the invention includes liquor feed conduits 10, 10a and 10b, which inject scrubber bleed liquor into submergence in the lower part of a sludge blanket 11 maintained in a first tank 12. Limestone slurry is introduced, via a conduit 13, onto or near the top of the sludge blanket. In the first reactor tank, the solids are lightly stirred by a rake assembly 14 that moves them toward the tank center 16. Since only a small quantity of solids are discharged, a circular flow pattern is established as indicated by the arrows and previously described in connection with FIGS. 1 and 2. Also, as shown in FIG. 1, additional stirrers 17 may be provided.

Solids discharged at the center outlet 16 are conducted by conduit 22 to merge with liquor overflowing the first tank at the weir 18 onto a conduit 21 then the mixture is supplied to the second reactor 19. If desired, the solids and overflow liquor can be conducted separately to the second reactor via conduit 21 and a branch conduit 22a.

A sludge blanket 23 is maintained in the second reactor 19. If the solids and liquor from the first stage are separately introduced into the second reactor then the liquor is injected into a lower part of the sludge blanket 23 and the sludge onto or near the top of the sludge blanket. Reaction occurs within the sludge blanket. Regenerated liquor discharges from the second reactor at overflow weir 18 thence flow via conduit 25 to the mix tank 28 where makeup soda ash is added and final polishing if desired is effected by sedimentation. From the tank 28, regenerated liquor returns to the scrubbers while settled solids are returned via conduit 29 to the second stage reactor or if desired, by conduit not shown, to the filter 27.

The manner of introducing the incoming scrubber bleed liquor is critical to this embodiment of the invention. Of a volume Q of scrubber bleed liquor a volume portion not more than (Q/2) is introduced into the first reactor to mix therein with the total limestone all of which is added to the first reactor. The total limestone is the stoichiometric amount needed for reaction with the $SO_2$ carried from the scrubber by bleed liquor Volume Q.

The limestone slurry is injected via conduit 13 onto or near the top of the sludge blanket while the bleed liquor is injected via conduit 10b into a lower portion of the sludge bed well below the elevation at which limestone enters the blanket. This manner of introduction is as illustrated in FIG. 2.

Reaction conditions in the first reactor are maintained such that the final effluent from the second reactor has a pH at or near pH 6.2. In the first reactor, the reaction is carried far enough toward completion that violent reaction with concomittant excessive gas evolution in the second state is minimized. This is accomplished by keeping the bleed liquor addition to the first stage well below, less than one-half of, the stoichiometrical quantity needed to react with the total added limestone. The reaction in the first stage definitely takes the "edge" off the reaction mass so that in the second reactor the reactions are less violent.

As noted, the bleed liquor supplied to the first reactor via conduit 10a is less than one-half the stoichiometric quantity for reaction with the limestone. The bleed liquor quantity is adjusted so that $CO_2$ gas evolution is kept under control. The balance of the bleed liquor—at least one-half Q, is conducted, via conduit 10b, directly to the second reactor where it is introduced into the lower part of the sludge blanket and mixes therein with the reaction products from the first reactor. The reaction products include first stage sludge blanket material (about 25% solids) discharged via valve 16 and conduit 22 and the first stage effluent discharged via weir 18 and conduit 21 into submergence in the second stage sludge blanket 23.

Reaction in the second stage is carried to substantial completion (less than 6% unreacted limestone). This is accomplished by residence time control and by monitoring the final effluent pH to be certain it stays close to pH 6.2.

From the second reactor sludge blanket material discharges via the center outlet and conduit 24 to a filter 27 whence filtrate is returned via conduit 30 to the second stage and a solids cake is wasted.

Numerous tests were made utilizing the system illustrated in FIG. 3.

In such tests, a 12" diameter vessel was used for the first stage and an 18" diameter vessel for the second stage.

The limestone slurry was made up from −200 mesh stone and simulated bleed liquor was made up as described supra in connection with the FIG. 1 system.

In typical tests, in the first stage, liquor residence averaged 54 minutes, effluent pH was 6.2–6.3 while in the second stage, liquor residence time averaged 150 minutes, the effluent pH was 6.2, the unreacted limestone ($CaCO_3$) ranged from 3.2 to 12.2; and the final charifier effluent contained an average suspended solids less than 300 ppm. The dry content of the waste filter cake ranged from 67.7 to 62.5 weight percent. The test where unreacted $CaCO_3$ was 12.2, was of short duration (7 hrs.). In tests of duration over 24 hours, the increased solids residence time reduced the unreacted $CaCO_3$ below 6%.

As noted herein the requirements to satisfy some of the process variables may have to be determined empirically. For instance, to supply the stoichiometric amount of limestone may require an excess of two to three percent over the calculated amount of limestone. Use of the term stoichiometric in connection with limestone is intended to encompass that variation.

I claim:

1. The continuous process for regenerating spent sulfur dioxide gas scrubber bleed liquor that contains $NaHSO_3$ and $Na_2SO_3$, by reacting said bleed liquor with a calcium compound which process comprises the steps of providing said calcium as a calcium carbonate slurry, establishing and maintaining respectively in serially connected first and second reaction zones first and second sludge blankets each containing from about fifteen to about forty percent by weight solids overlain respectively by first and second supernatant liquor pools containing less than about two percent by weight solids, subjecting said sludge blankets to gentle agitation to effect mixing of the sludge, continuously introducing said calcium carbonate slurry into an upper portion of said first sludge blanket below said first supernatant pool while continuously introducing into submergence in a lower portion of said first sludge blanket a stream of said scrubber bleed liquor, withdrawing supernatant liquor from said first supernatant pool and introducing it into submergence in the lower portion of said second sludge blanket, withdrawing sludge from said first sludge blanket and introducing the same into an upper portion of said second sludge blanket, and withdrawing regenerated scrubbing liquid from said second supernatant pool and solids from said second sludge blanket in amounts proportional respectively to the amounts of bleed liquor and limetone supplied to said reaction zones.

2. The process according to claim 1 in which said bleed liquor is divided into two portions, one of said portions is introduced into submergence in the lower portion of each one of said sludge blankets and substantially all of said limestone slurry is introduced into an upper portion of said first sludge blanket.

3. The process according to claim 2 in which the residence time of solids and liquor in said first and second reaction zones is controlled so that the pH of liquor at discharge from said second supernatant pool is about 6.2, said control being effected by regulation of the respective rates of supply of solids and liquor to said first sludge blanket in said first reaction zone and the rate of transfer thereof from said first zone to said second zone and by the rate of the separate discharge of solids and liquor respectively from said second sludge blanket and said second supernatant pool.

4. The process according to claim 3 in which the rate of supply of bleed liquor to the first sludge blanket is substantially constant and the pH of supernatant liquor discharged from said second reaction zone is controlled by regulating the rate of supply of limestone to said first sludge blanket.

5. The process according to preceding claim 3 in which the rate of supply of bleed liquor to said first sludge blanket is substantially constant and the pH of the supernatant liquor discharged from said second supernatant pool is controlled by regulating the rate of transfer of solids from said first sludge blanket to said second reaction zone.

* * * * *